United States Patent [19]

Tsai

[11] Patent Number: 5,006,298
[45] Date of Patent: Apr. 9, 1991

[54] METHOD OF PRODUCING A BADMINTON RACKET FRAME

[76] Inventor: Ko-Jan C. Tsai, No. 30, Sec. 2, Ya Tan Rd., Tan Tzu Hsiang, Taichung Hsien, Taiwan

[21] Appl. No.: 545,207

[22] Filed: Jun. 28, 1990

[51] Int. Cl.⁵ ............. B29C 49/20; B29C 49/22; B29C 49/46; A63B 49/10
[52] U.S. Cl. .................... 264/512; 156/191; 156/194; 156/245; 264/85; 264/523; 273/67 R; 273/73 F; 273/73 G
[58] Field of Search ......... 264/512, 516, 85, 523, 264/552, 314, 258, 570; 425/503, 112; 156/285, 194, 190, 191, 192, 245; 273/67 R, 73 R, 73 C, 73 G, 73 F

[56] References Cited

U.S. PATENT DOCUMENTS

| 2,743,483 | 5/1956 | Parini | 264/570 |
|---|---|---|---|
| 4,192,505 | 3/1980 | Tabickman et al. | 273/73 C |
| 4,292,101 | 9/1981 | Reichert | 156/245 |
| 4,360,202 | 11/1982 | Lo | 273/73 G |
| 4,389,269 | 6/1983 | Cooper et al. | 156/194 |
| 4,393,024 | 7/1983 | You | 264/162 |
| 4,575,084 | 3/1986 | Yoneyama | 273/73 G |
| 4,931,247 | 6/1990 | Yeh | 264/258 |

FOREIGN PATENT DOCUMENTS 56-133130  10/1981  Japan ............... 273/73 R

*Primary Examiner*—Jan H. Silbaugh
*Assistant Examiner*—Catherine Timm
*Attorney, Agent, or Firm*—Staas & Halsey

[57] ABSTRACT

A method of producing a badminton racket frame includes the following steps. Prepare a mold cavity. Wrap a number of layers of graphite fibers so as to form a shell shaped in the form of the racket frame. Insert solvent material into the shell. Arrange the shell within the mold cavity. Heat the solvent material to cause expansion and to generate pressure within the mold cavity so as to press against the layers of graphite fibers and thereby provide intimate bonding of the layers. Remove the shell as an integral composite badminton racket frame.

3 Claims, 5 Drawing Sheets

METHOD OF PRODUCING A BADMINTON RACKET FRAME

BACKGROUND OF THE INVENTION

The present invention relates to a method, and more particularly to a method of producing a badminton racket frame.

There are two main processes which are widely used for making or producing tennis or badminton rackets in the world today. First of all, a comparison of the playing function and the racket property between a tennis racket and a badminton racket is listed in Table 1.

TABLE 1

| ITEM | PLAYING FUNCTION | RACKET PROPERTY |
|---|---|---|
| Badminton racket | 1 Less momentum | Vibration is careless |
| | 2 Ball travels at a lower speed when striking | Top frame should be strong and rigid, the string tension should be as high as possible |
| | 3 Power comes mostly from the player himself | Flexible and explosive powerful shaft is needed |
| | 4 Big deflection at the shaft during the play | Shaft should be durable with stiffness equal on its both sides |
| Tennis Racket | 1 More momentum | Vibration is crucial |
| | 2 Ball travels at a higher speed when striking | Strong frame and proper flexibility on the yoke area could have a good rebound and comfortable feeling |
| | 3 Power comes mostly from the response of stroke | Comfortable condition area essential, for instant: larger sweet-spot, proper weight and balance for individual players |

It is very important that different rackets which have different function requirements should be made by different manufacturing processes.

The first method employs a foamable material. The racket comprises a core which includes a foamable material or a foamable resin composition. U.S. Pat. No. 4,129,634 to Cecka et al. discloses a method for producing a racket frame which has a strip shaped foamable plastic core disposed therein. The strip of foamable material is maintained within a seamless sleeve made of a thin, flexible cellulosic film which is disposed in an outer shell forming the racket frame. The outer shell is disposed in a mold cavity. The foamable material is caused to expand and to generate pressure within the mold cavity and thereby provide intimate bonding of the core to the shell. It is very important that a steady and firm pressure is required to be applied to the frame during the curing stage. As shown in FIG. 4, the powder of foaming agent is blended into or added to the plastics carrier in order to form a strip of foamable material. Generally, the powder of foaming agent can not be blended evenly in the plastics carrier so that the strip of foamable material has a limited uniformity and may not be expanded or inflated uniformly or evenly. In addition, the racket frame which is made by the above-mentioned method with a core disposed therein has a weight heavier than the hollow racket frames.

The second method is an air injection method which employs a pressurized air injected into the racket frame. This is the most popular method used today to manufacture both badminton racket and tennis racket. As shown in FIG. 5, the composite structure of the tennis racket frame 20 includes a plurality of layers, each made of a sheet of composite fibers, unidirectionally oriented and resin-impregnated. The tennis racket frame 20 has a fluent and smooth passage 21 or hollow interior formed therein and has no sharp angles formed therein so that the pressurized air can be easily injected into the passage 21 of the racket frame 20 from one end of the passage 21. Therefore, the air injection method is suitable for manufacturing tennis racket frames.

As shown in FIG. 6, the composite structure of the badminton racket frame comprises a shell 10 including a plurality of layers, each made of a sheet of composite fibers, unidirectionally oriented and resin-impregnated. The shell 10 includes a head section 11 and a handle shaft 12 with a passage 14 formed therethrough. One end 15 of the shell 10 is closed. A sharp angle exists between the head section 11 and the handle shaft 12 or in the so called T-joint area. During a heating process and/or a compression process, a pressurized air is continuously injected into the passage 14 from the free end of the handle shaft 12 in order to expand the shell 10 which is arranged within a mold cavity. Occasionally, the pressurized air is jammed or obstructed in the sharp angle portion of the T-joint area, and may not flow through this portion swiftly. In addition, when the pressurized air is injected into the passage 14, the head section 11 inflates and the closed end 15 has a tendency to extend toward and to press the passage 14 of the shell 10, particularly the sharp angle area so that the angle area will further be obstructed. Therefore, because of the two deadly problems as mentioned above, about 25% of the products made by this method are rejected products and are unacceptable. Furthermore, a compressor or the like is required to produce and to provide the pressurized air.

The present invention has arisen to solve the afore-described disadvantages of the conventional method for producing badminton racket frames.

SUMMARY OF THE INVENTION

The primary objective of the present invention is to provide a method of producing a badminton racket frame which has an evaporable solvent disposed therein in order to generate a pressure within the racket frame so that the racket frame can be formed uniformly and homogeneously.

In accordance with one aspect of the invention, there is provided a method of producing a badminton racket frame which includes preparing a mold cavity shaped in the form of a badminton racket frame having a head section and a handle shaft. A number of layers of unidirectionally oriented resin-impregnated graphite fibers are wrapped so as to form a shell shaped in the form of the sections. Solvent material is inserted into the shell and the ends of the shell are closed. The wrapped shell is arranged within the mold cavity. The solvent material is heated to cause expansion and to generate pressure within the mold cavity so as to press against the layers of graphite fibers and thereby provide intimate bonding of the layers. The shell is removed as an integral composite badminton racket frame.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
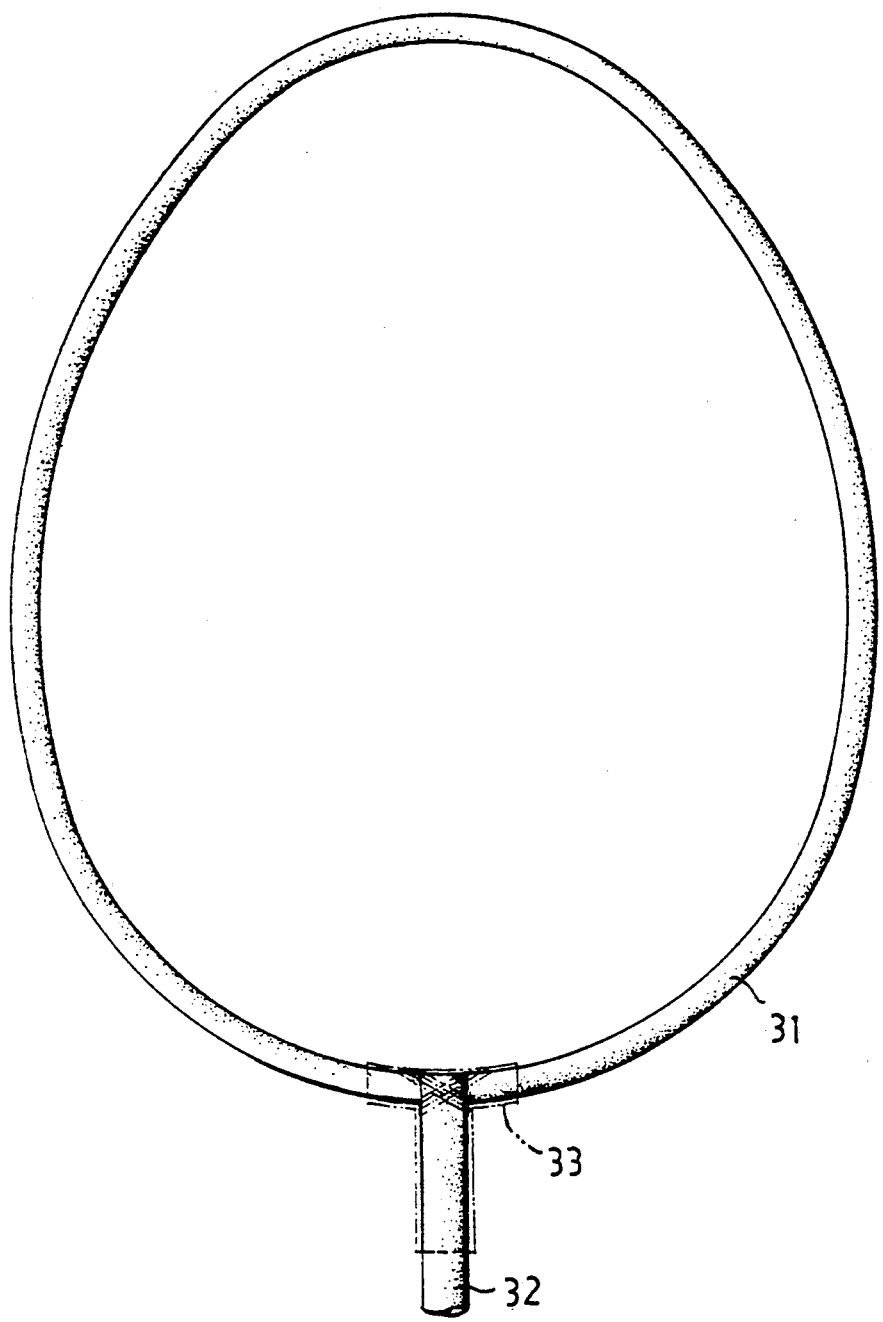
FIG. 1 is a schematic view of a badminton racket frame made by a method in accordance with the present invention.
Figure 2:
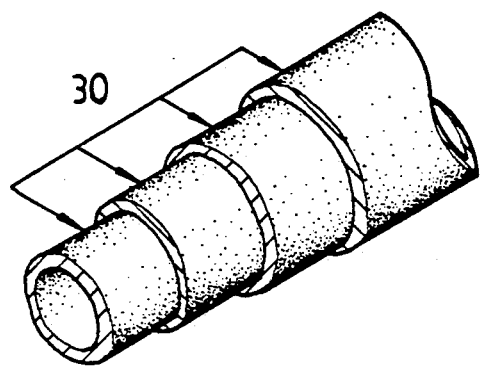
FIG. 2 is an enlarged cross sectional view showing the composite structure of the badminton racket frame which has a plurality of successive layers serially exposed.
Figure 3:
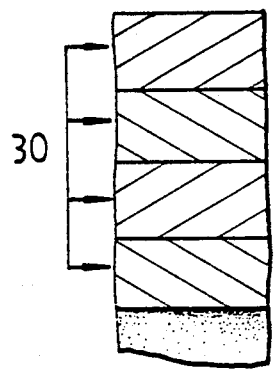
FIG. 3 is an enlarged view of a portion of the unidirectionally oriented resin-impregnated graphite fiber structure of the badminton racket frame, with successive layers serially exposed.
Figure 4:
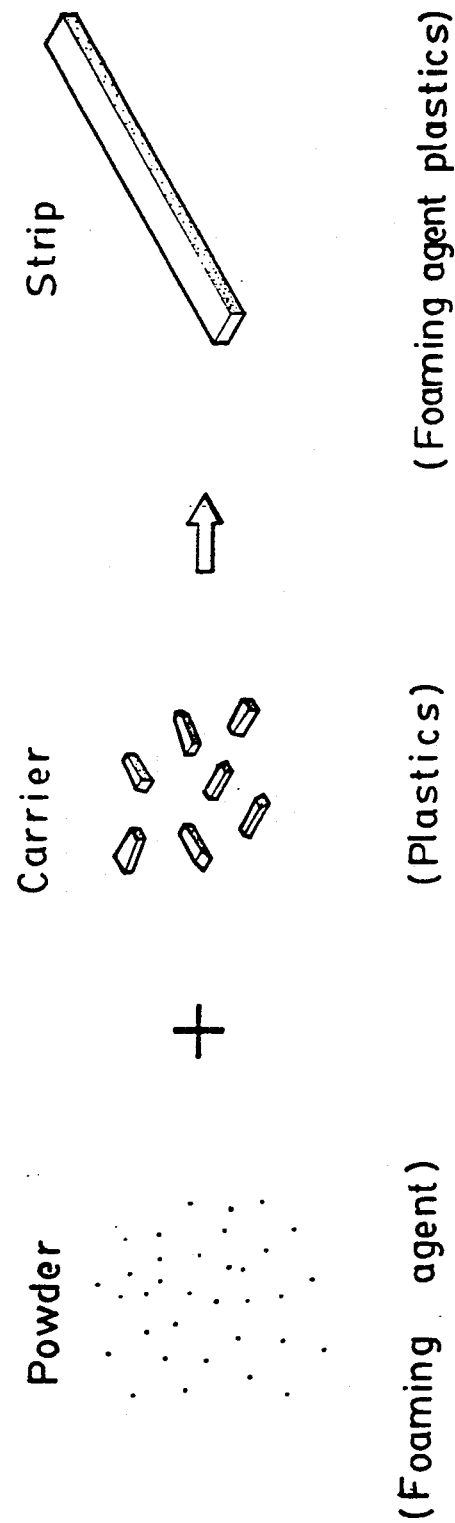
FIG. 4 is a schematic view illustrating the compositions of a strip of a foamable material.
Figure 5:
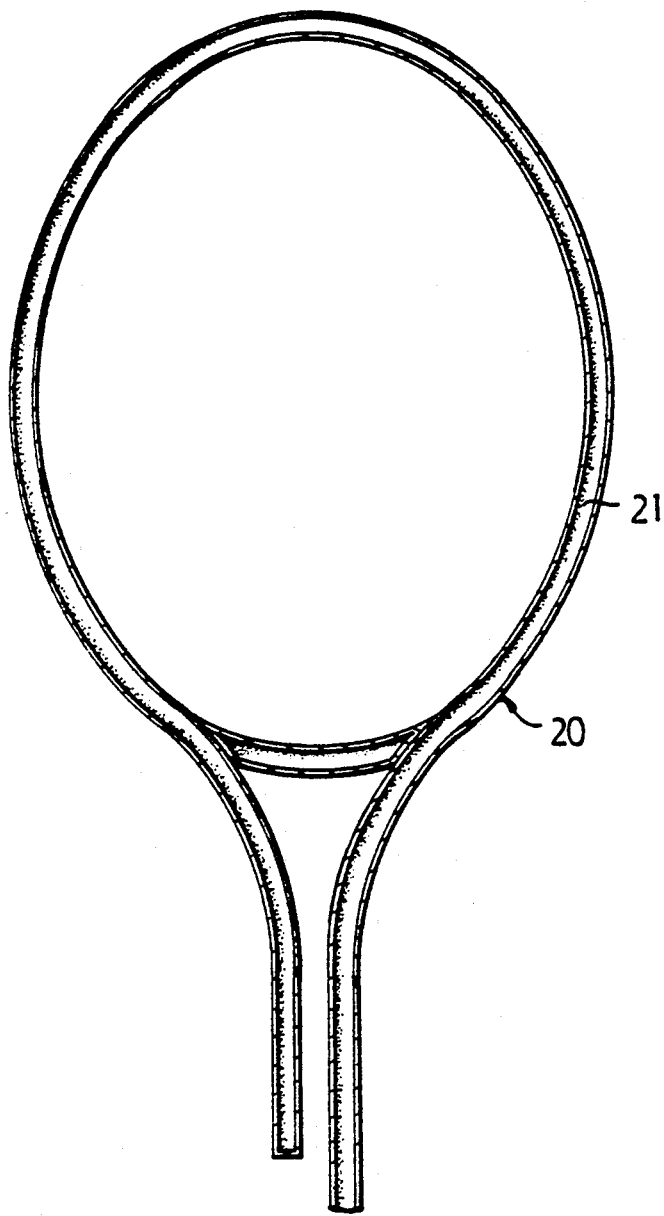
FIG. 5 is a schematic view of a tennis racket frame made by a conventional air injection method.

Referring to FIGS. 1, 2 and 3, the badminton racket frame in accordance with the present invention comprises a head section 31 and a handle shaft 32 with a grip affixed to the lower end of the handle shaft 32.

The structure of the racket frame is generally a shell comprising a plurality of layers 30, each made of a sheet of a so-called prepreg of composite material, or a unidirectionally oriented and resin-impregnated composite material, such as graphite fiber, boron fiber or glass fiber etc., in which most of the racket frames are made of graphite fibers. It is preferable that every two adjacent layers 30 are arranged at predetermined or suitable angles to each other, as shown in FIG. 3. The graphite fibers used to make the graphite fiber sheets comprises yarns containing hundreds, or thousands, of individual filaments, as is known in the art.

The composite structure of this invention is made in a molding process within a rigid mold capable of withstanding the internal forces caused by the pressure developed in the curing cycle. The composite structures of the head section 31 and the handle shaft 32 are wrapped individually to a tubular shell which is disposed in a mold cavity of the rigid mold. A solvent material, such as methylene chloride or toluene etc., which is evaporable is provided or injected into each of the shells before the ends of the shells are closed. The solvent material which is in liquid state is freely disposed in the shell. In the yoke area of the racket frame, the ends of the shell of the head section 31 contact the upper end of the shell of the handle shaft 32 and are coupled together by a plurality of layers of resin-impregnated graphite fibers arranged at 45 degrees to the longitudinal direction of the handle shaft, and preferable alternating between +45 and −45 degrees, as shown in dotted lines in FIG. 1. A reinforcement sheet 33 is preferably wrapped over the fiber sheets at the coupling portions of the ends of the fiber shells.

The solvent material is caused to evaporate or to expand from liquid state to gaseous state by the heat during the curing process. As the solvent agent expands, it generates pressure within the confined mold cavity in order to bond together the graphite fiber layers into a unitary shell. The pressure which is generated by the vaporized solvent material is even and homogenous. Upon completion of the curing cycle, the mold is cooled and then opened; and the molded frame is removed. Holes for strings are drilled in the head. Thereafter, the balance of the frame is checked and adjusted. The frame is painted and the strings are installed. A racket frame or excellent structural integrity is thus obtained. The racket frame has a hollow interior.

It is very important to determine the required mass and/or the volume of the solvent material before it is injected into the shell. The required mass of the solvent material is determined by the gas equation as follows:

$$PV = nRT = (m/M)RT,$$

in which

P is the pressure in each shell, (atm),
V is the volume in each shell, (l)
n is the molecular number (moles), (n=m/M)
m is the mass of the solvent material (gm),
M is the molecular weight of the solvent material (gm/mole),
R is the universal gas constant (0.082 atm−1/mole K), and
T is the absolute temperature (degree K),
(T=273+ the heating temperature during curing process, degree C).

The inside volume of the racket frame V, the universal gas constant R and the molecular weight M of the solvent material to be used can be selected and predetermined. Therefore, when a required heating temperature T and pressure P for a curing process are selected, i.e., when the temperature and the pressure P are determined, the mass of the solvent material can be precisely calculated by this equation.

The following is an example for calculating the required mass of the solvent material:

the volume in a shell V=0.07 l, a selected curing temperature 150° C. (T=273+150K), a selected pressure in the shell P=10 atm, gas constant R=0.082 atm−1/mole K, and the molecular weight of a ethylene chloride M=97.0 gm/mole; therefore, according to the above-mentioned equation:
m=PVM/RT=(10*0.07*97.0)/(0.082*423)=1.96 gm. Accordingly, the required mass of the solvent material can be precisely calculated.

Accordingly, the method in accordance with the present invention can produce a badminton racket frame of excellent structural integrity. No foamable materials are required. The badminton racket frame can be produced easily without a compressor which is required in a conventional method to generate a pressurized air in order to produce the racket frames. In addition, there is only about 2 grams of solvent material is required for manufacturing a badminton racket frame. The method is also suitable for manufacturing other objects which is made of composite materials, such as tennis racket.

Figure 6:
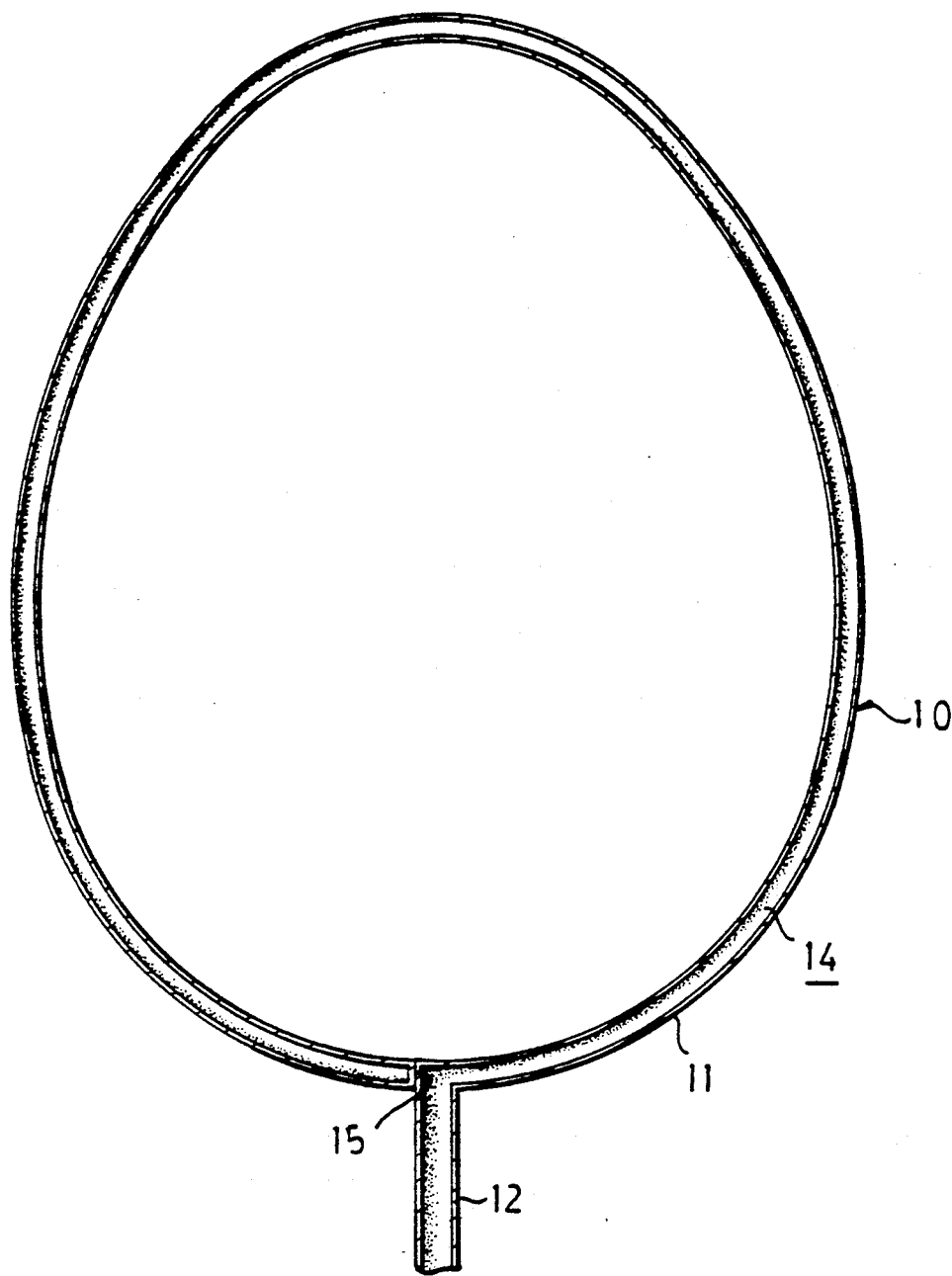
FIG. 6 is a schematic view of a badminton racket frame made by a conventional air injection method.

Alternatively, a continuous shell for both the head section 31 and the handle shaft 32 of the racket frame, similar to the shell as shown in FIG. 6, is prepared and arranged within the mold cavity. Both ends of the continuous shell are closed after the solvent material is inserted into the shell. An even and steady pressure which is generated by the vaporized solvent material is applied to the racket frame during curing stage.

Further alternatively, the handle shaft 32 of the racket frame is preshaped and cured before inserting into the mold cavity. Only the head section 31 is cured under the method as described above. In this case, only both ends of the shell of the head section are closed before they are wrapped together with the upper end of the handle shaft 32 which has already cured, and the shell is arranged within the mold cavity so that the solvent material is limited to vaporize within the shell of the head section.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method of producing a badminton racket frame comprising preparing a mold cavity shaped in the form of said badminton racket frame having generally a head section and a handle shaft, wrapping a plurality of layers of unidirectional oriented resin-impregnated graphite fibers so as to form a first tubular shell shaped in the form of said handle shaft and a second tubular shell shaped in the form of said head section, inserting solvent material into said first shell and second shell, closing both ends of said first shell and said second shell, wrapping said ends of said second shell and an upper end of said first shell together by a plurality of layers of unidirectionally oriented resin-impregnated graphite fibers, arranging said wrapped first shell and said second shell within said mold cavity, heating said solvent material to cause expansion from the liquid state to the gaseous state and to generate pressure within said mold cavity so as to press against said layers of graphite fibers and thereby provide intimate bonding of said layers, and thereafter removing from said mold cavity said first shell and said second shell as an integral composite badminton racket frame.

2. A method of producing a badminton racket frame comprising preparing a mold cavity shaped in the form of said badminton racket frame having generally a head section and a handle shaft, wrapping a plurality of layers of unidirectionally oriented resin-impregnated graphite fibers so as to form a continuous tubular shell shaped in the form of said head section and said handle shaft, inserting solvent material into said continuous tubular shell, closing both ends of said continuous tubular shell, wrapping a yoke area of said shell by a plurality of layers of unidirectionally oriented resin-impregnated graphite fibers, arranging said wrapped continuous shell within said mold cavity, heating said solvent material to cause expansion from the liquid state to the gaseous state and to generate pressure within said mold cavity so as to press against said layers of graphite fibers and thereby provide intimate bonding of said layers, and thereafter removing from said mold cavity said continuous shell as an integral composite badminton racket frame.

3. A method of producing a badminton racket frame comprising preparing a mold cavity shaped in the form of said badminton racket frame having generally a head section and a handle shaft, preparing a first shell which has been cured and which has a shape in the form of said handle shaft, wrapping a plurality of layers of unidirectionally oriented resin-impregnated graphite fibers so as to form a second tubular shell shaped in the form of said head section, inserting solvent material into said second tubular shell, closing both ends of said second shell, wrapping said ends of said second shell and an upper end of said first shell together by a plurality of layers of unidirectionally oriented resin-impregnated graphite fibers, arranging said wrapped first shell and said second shell within said mold cavity, heating said solvent material to cause expansion from the liquid state to the gaseous state and to generate pressure within said mold cavity so as to press against said layers of graphite fibers of said second shell and thereby provide intimate bonding of said layers, and thereafter removing from said mold cavity said first shell and said second shell as an integral composite badminton racket frame.

* * * * *